United States Patent
Rudelic

(10) Patent No.: US 8,539,238 B2
(45) Date of Patent: Sep. 17, 2013

(54) AUTHENTICATED NONVOLATILE MEMORY SIGNING OPERATIONS

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1471 days.

(21) Appl. No.: 11/746,310

(22) Filed: May 9, 2007

(65) Prior Publication Data

US 2008/0282088 A1 Nov. 13, 2008

(51) Int. Cl.
*H04L 9/00* (2006.01)

(52) U.S. Cl.
USPC .......................... 713/172; 713/168; 713/176

(58) Field of Classification Search
USPC .................... 713/168, 172, 176, 193
See application file for complete search history.

(56) References Cited

U.S. PATENT DOCUMENTS

| | | | | |
|---|---|---|---|---|
| 5,844,986 A | * | 12/1998 | Davis | 713/187 |
| 6,510,521 B1 | * | 1/2003 | Albrecht et al. | 713/193 |
| 7,613,915 B2 | * | 11/2009 | Srinivasan et al. | 713/1 |
| 2002/0169960 A1 | * | 11/2002 | Iguchi et al. | 713/174 |
| 2004/0015709 A1 | * | 1/2004 | Chen et al. | 713/193 |
| 2004/0059916 A1 | * | 3/2004 | Mizushima et al. | 713/172 |
| 2006/0036853 A1 | * | 2/2006 | Chen et al. | 713/161 |
| 2006/0259790 A1 | * | 11/2006 | Asokan et al. | 713/194 |
| 2007/0101143 A1 | * | 5/2007 | Iwata et al. | 713/172 |
| 2007/0220120 A1 | * | 9/2007 | Tsunehiro et al. | 709/220 |
| 2008/0276088 A1 | * | 11/2008 | Ahlquist | 713/168 |

* cited by examiner

*Primary Examiner* — Brandon Hoffman
*Assistant Examiner* — Samuel Ambaye
(74) *Attorney, Agent, or Firm* — Kacvinsky Daisak PLLC

(57) ABSTRACT

A wireless device includes a nonvolatile memory that handles the task of securely performing integrity checks that do not expose the authentication private key externally. The system security architecture installs and associates private keys with the nonvolatile memory to create a secure execution environment resistant to virus attack. The nonvolatile memory provides integrity checks of nonvolatile memory data and generates signatures for data provided by the memory.

6 Claims, 4 Drawing Sheets

AUTHENTICATED NONVOLATILE MEMORY SIGNING OPERATIONS

Technological developments permit digitization and compression of large amounts of voice, video, imaging, and data information. Evolving applications have greatly increased the need for large amounts of data storage and increased memory capabilities to handle data transfers from one device to another. Protecting user privacy, sensitive information, application and firmware code and other digital assets is a concern for environments in consumer applications. Devices with embedded applications need a secure way to authenticate with each other over networks, check the integrity of stored information and transfer information securely. Improvements to the mechanisms that provide such integrity checks are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
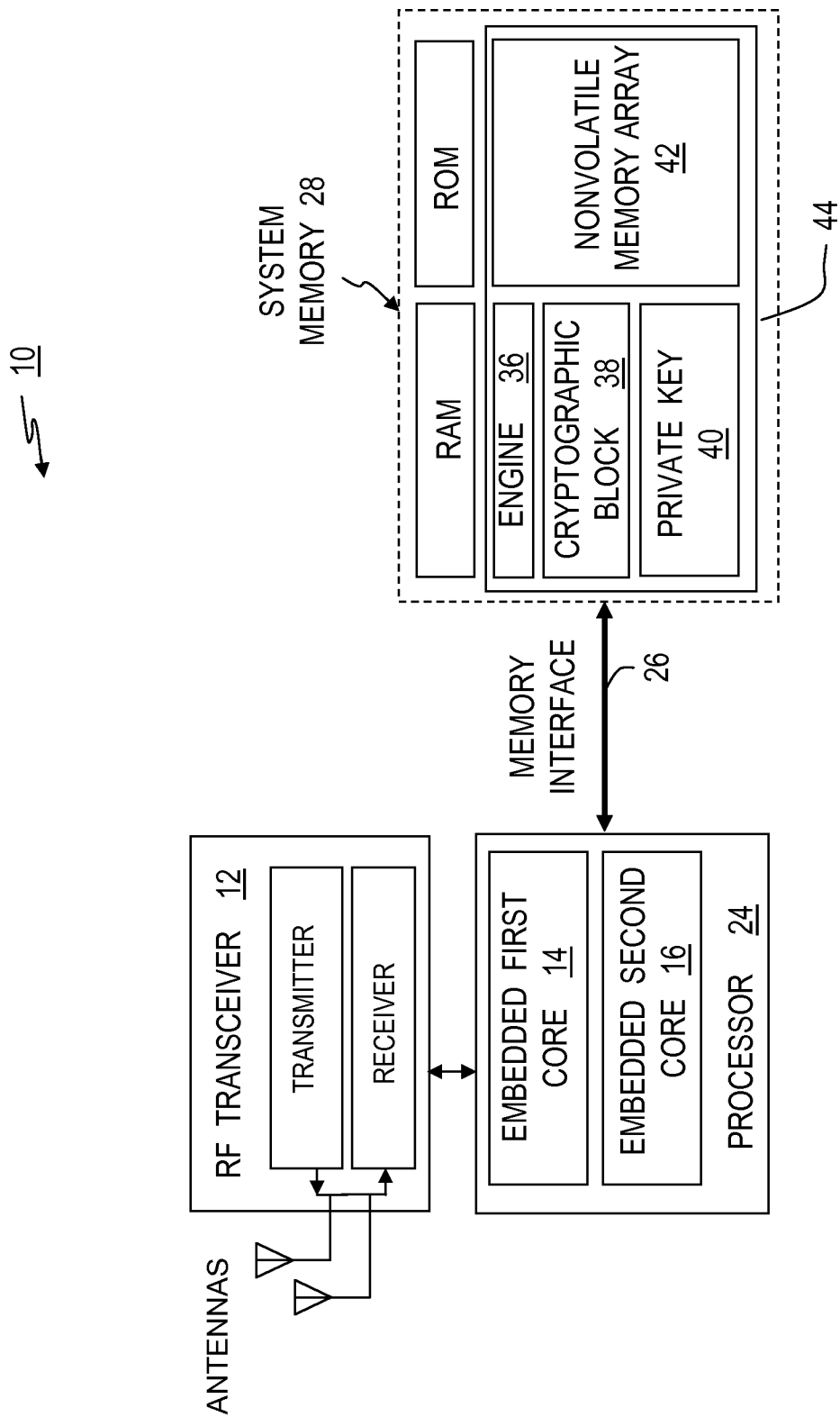
FIG. 1 is a block diagram that illustrates a wireless device that executes algorithms to provide integrity checks of returned nonvolatile memory data based on a private key in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The embodiment illustrated in FIG. 1 shows a wireless communications device 10 that includes one or more radios to allow communication with other over-the-air communication devices. Communications device 10 may operate in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks. The radio subsystems collocated in the same platform of communications device 10 provide the capability of communicating in an RF/location space with the other devices in the network.

However, it should be noted that the present invention is not limited to wireless applications and a variety of products may use the claimed subject matter. For instance, the present invention may be incorporated into desktop computers, laptops, smart phones, MP3 players, cameras, communicators and Personal Digital Assistants (PDAs), medical or biotech equipment, automotive safety and protective equipment, automotive infotainment products, etc. It should be understood that the scope of the present invention is not limited to these examples.

The simplistic wireless embodiment illustrates the coupling of antenna(s) to the transceiver 12 to accommodate modulation/demodulation. In general, analog front end transceiver 12 may be a stand-alone Radio Frequency (RF) discrete or embedded with a processor as a mixed-mode integrated circuit where the processor processes functions that fetch instructions, generate decodes, find operands, and perform appropriate actions, then stores results. The processor may include baseband and applications processing functions and utilize one or more processor cores 20 and 22 to handle application functions and allow processing workloads to be shared across the cores. The processor may transfer data through an interface 26 to memory storage in a system memory 28.

FIG. 1 further illustrates functional blocks that execute algorithms in accordance with embodiments of the present invention to provide integrity checks based on a private key stored within nonvolatile memory 44. Nonvolatile memory 44 is embedded with an engine 36, a cryptographic block 38, storage of a private key 40, and a nonvolatile memory array 42. The private key is protected internal to nonvolatile memory 44 and not available externally, and thus, engine 36 enables uCode to execute within nonvolatile memory 44 that uses the private key 40 to generate signatures for data stored in the nonvolatile memory array 42. Without intervention from the host processor, nonvolatile memory 44 has the ability to sign and authenticate data to provide data integrity to applications that execute within processor 24 or to applications that may operate external to processor 24.

Nonvolatile memory 44 includes cryptographic block 38 to provide Random Number Generator (RNG) capabilities, SHA capabilities, RSA capabilities, and other cryptographic protocols or encryption protocols to perform security related functions. RSA algorithm computations allow messages to be encrypted with a public key and decrypted using the locally provided private key. Nonvolatile memory 44 is a secure memory that is embedded with functional blocks to internally authenticate memory commands. Thus, without the intervention of processor 24, nonvolatile memory 44 uses private key 40 to authenticate memory commands issued by memory engine 36 before those commands execute. The private key(s) installed into nonvolatile memory 44 allow the memory to internally generate signatures for data within the nonvolatile memory that may be transferred or synchronized with external applications or the host processor.

Nonvolatile memory 44 includes internal functional blocks with capabilities to sign data using the protected private key 40 that is stored internal to nonvolatile memory 44. Thus, rather than using a private key maintained within the host processor and software that shares that private key with the flash memory, nonvolatile memory 44 includes hardware and software that performs signing of the data stored in nonvolatile memory array 42. In other words, an inverse functionality is performed by nonvolatile memory 44, namely, nonvolatile memory 44 provides the authentication operation and the ability to sign data to transmit to an external source and/or application.

Figure 2:
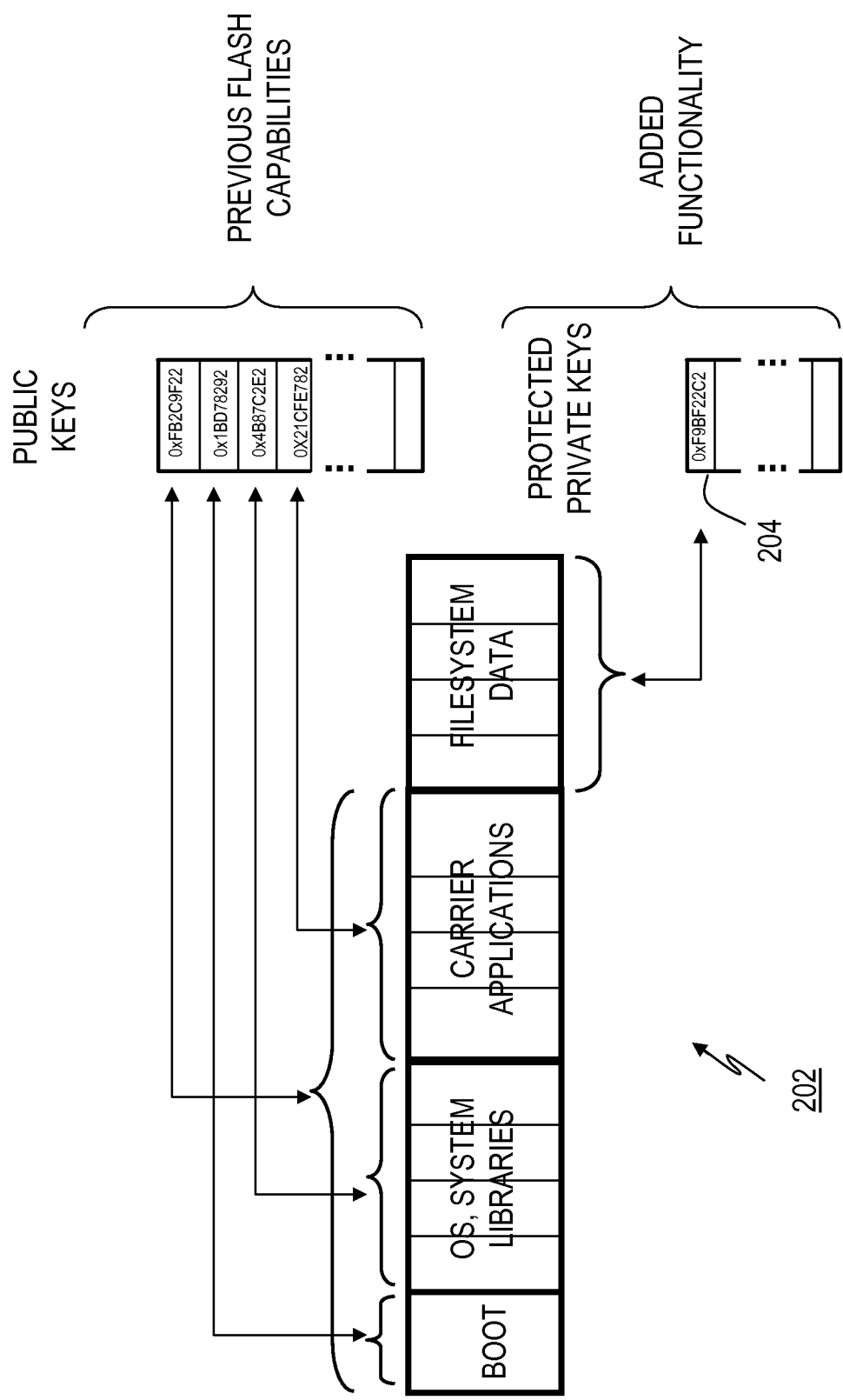
FIG. 2 is a block diagram that describes a filesystem with protected private keys to authenticate and sign data on the nonvolatile memory side.

FIG. 2 shows prior art flash memory capabilities and authenticated operations capabilities added to nonvolatile memory 44 in accordance with embodiments of the present invention. In particular, nonvolatile memory 44 shows a filesystem 202 that includes added protected storage 204. The protected storage 204 adds capabilities to nonvolatile memory 44 to associate the private key(s) with a range of data stored in nonvolatile memory array 42. Note that the protected private key 40 is not stored in the filesystem, but it is used to sign data in the filesystem for transfer.

Filesystem 202 allocates a fixed partition of the system memory that allows device drivers to transfer data between the system memory and buffers within the host processor. Filesystem 202 provides a directory of the contents stored in the system memory that may include permissions, ownership, access rights, a timestamp (when last modified), and access time, among other properties. The structure of filesystem 202 provides manipulation of data and properties for nonvolatile memory 44. In accordance with embodiments of the present invention, nonvolatile memory 44 provides the ability to securely sign data and to drive the secure synchronization capability. Nonvolatile memory 44 solves the issue of privacy by using the internally stored private key for generating signatures on platforms. Nonvolatile memory 44 supports a command to sign a range of data in the filesystem data range.

Figure 3:
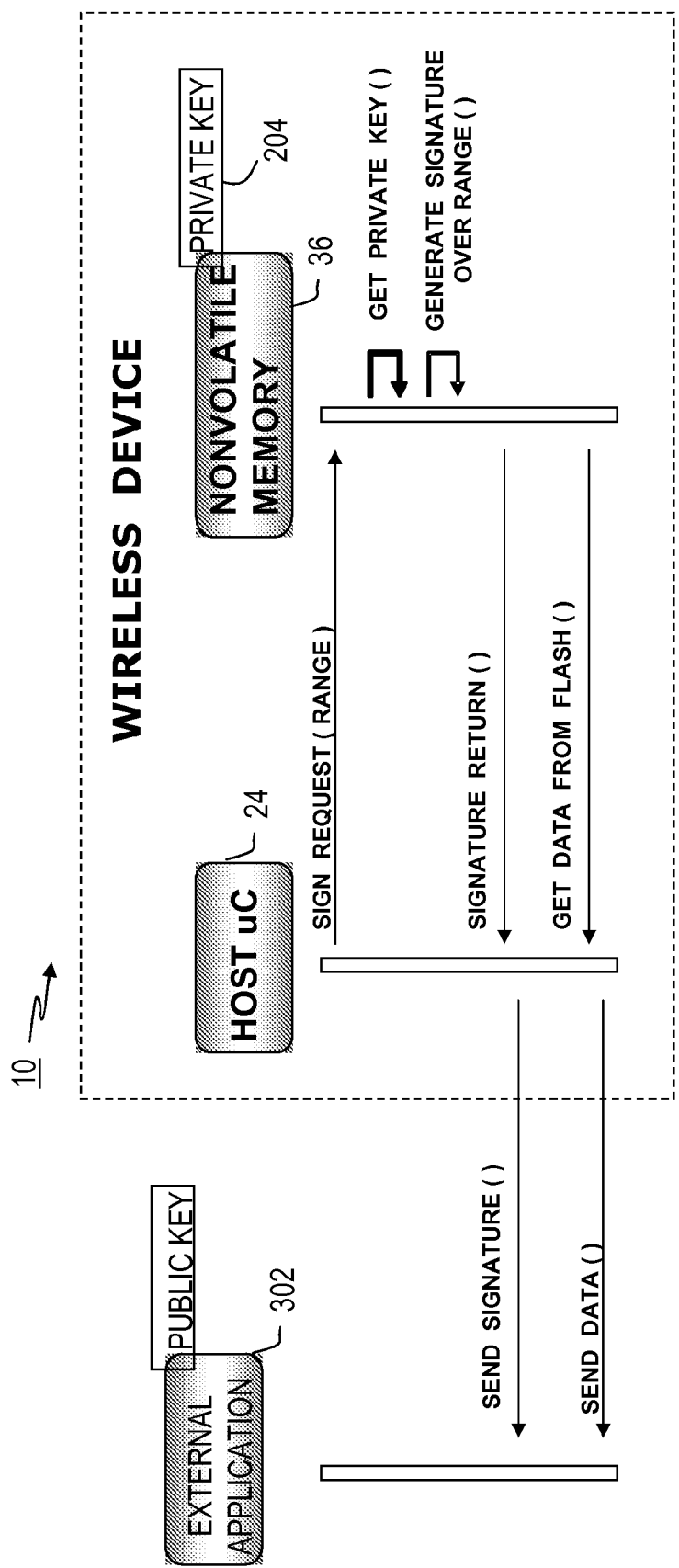
FIG. 3 is a block diagram showing a wireless device having a processor and nonvolatile memory with a private key in accordance with the present invention.

FIG. 3 represents a wireless device 10 that includes a processor 24 connected to a nonvolatile memory 44 in accordance with various embodiments of the present invention to facilitate an isochronous integrity check of nonvolatile data returned from nonvolatile memory 44. The figure shows an external application 302 that receives nonvolatile data and the signature from wireless device 10. The engine 38 in the nonvolatile memory 44 returns authenticated data from the core nonvolatile device memory, using private key 40 to provide a signature to authenticate the security of the data being transferred.

Figure 4:
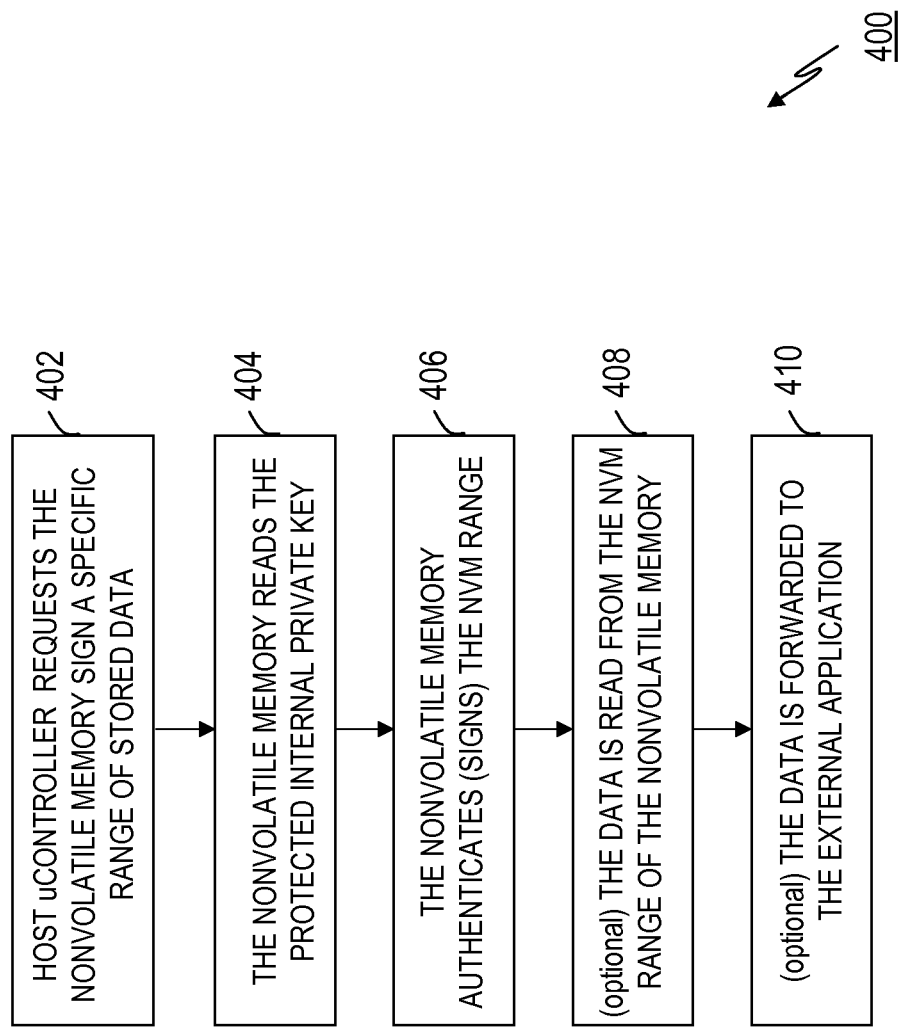
FIG. 4 is a flowchart that describes the integrity check performed by the nonvolatile memory when data is requested from the memory.

FIG. 4 is a flowchart that describes a process that may be used in the algorithm presented for the present invention to authenticate operations of the nonvolatile memory. The method 400, or portions thereof, performed by nonvolatile memory 44 are not limited by the particular type of apparatus, software element, or system performing the method. In block 402, processor 24 invokes a nonvolatile command to sign a specific range of nonvolatile data that is stored in nonvolatile memory 44. In block 404, nonvolatile memory 44 reads the protected internal private key (shown as private key 40 in FIG. 1). The nonvolatile memory 44 signs the range of stored data to authorize the command. In block 406, nonvolatile memory 44 authenticates the nonvolatile address range. In block 408, authenticated data may be read from the nonvolatile range of the nonvolatile memory 44. In block 410, the authenticated data may be passed from nonvolatile memory 44 to processor 24 and the external application. Method 400 illustrates that access to the range of data stored within nonvolatile memory 44 is granted based on the private key stored by the memory to check the integrity of the code or data read from nonvolatile memory 44 before execution or usage of the data.

By now it should be apparent that embodiments of the present invention provide an execution environment to securely perform integrity checks by the nonvolatile memory device that do not expose the authentication private key externally. By installing and associating private keys with the nonvolatile memory, the system security architecture creates a secure execution environment resistant to virus attack by providing integrity checks of nonvolatile memory data. In accordance with the present invention, it is the nonvolatile memory that generates signatures for data internal to the memory.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A nonvolatile memory device, comprising:
   an authentication engine in a nonvolatile memory;
   a filesystem to use a private key not accessible to a host processor external to the nonvolatile memory, the private key stored in the internal storage of the nonvolatile memory and used to authorize a memory command to access data stored within the nonvolatile memory; and
   a flash range in a nonvolatile memory array to store the data, wherein use of the private key also allows the nonvolatile memory to internally generate signatures for the data stored in the flash range to internally authenticate the data accessed by the authorized memory command, the internally authenticated data stored in the flash range and the signatures used to authenticate the data stored in the flash range capable of being passed from the nonvolatile memory to the host processor and to an external application.

2. The nonvolatile memory device of claim 1 further including:
   a cryptographic block to provide cryptographic protocols or encryption protocols to perform security related functions.

3. A method comprising:
   invoking a command by an external processor to a nonvolatile memory for the nonvolatile memory to internally sign data stored in a specific range of a nonvolatile memory array included in the nonvolatile memory;
   reading a protected internal private key in the nonvolatile memory that is not accessible to the external processor;
   signing the data using the protected internal private key stored in the specific range to authorize the command;
   authenticating the data stored in the specific range of the nonvolatile memory array using the protected internal private key, the internal protected key to allow the nonvolatile memory to internally generate signatures for the data stored within the specific range of the nonvolatile memory array, the internally generated signatures capable of being transferred to or synchronized with external applications or the external processor: and
   passing the authenticated data stored in the specific range of the nonvolatile memory array from the nonvolatile memory to the external processor and to an external application.

4. The method of claim 3 further comprising:
   reading the authenticated data stored in the specific range of the nonvolatile memory array.

5. A method comprising:
   invoking a command by an external processor to a nonvolatile memory for the nonvolatile memory to internally sign data stored within a range of a nonvolatile memory array, wherein a private key stored by the nonvolatile memory and not accessible to the external processor is used by the nonvolatile memory to internally sign the data stored within the range of the nonvolatile memory array and authorize the command; and receiving the signed data and the signature used to sign the data from the nonvolatile memory; and routing the signature and the signed data from the external processor to an external application;

passing the authenticated data stored in the specific range of the nonvolatile memory array from the nonvolatile memory to the external processor and to an external application.

6. A method of signing data by a nonvolatile memory, comprising:

receiving a command by the nonvolatile memory to internally sign data stored in a range of a nonvolatile memory array;

reading a protected private key stored in the nonvolatile memory that is not accessible to a processor external to the nonvolatile memory ;

using the protected private key to authorize the command;

signing the data stored in the range of the nonvolatile memory array using the protected private key to authenticate the data stored in the range of the nonvolatile memory array;

reading authenticated data from the range of the nonvolatile memory array;

passing the authenticated data read from the range of the nonvolatile memory array and the signature used to authenticate the data to the processor external to the nonvolatile memory; and passing the authenticated data read from the range of the nonvolatile memory array and the signature used to authenticate the data to an external application.

* * * * *

UNITED STATES PATENT AND TRADEMARK OFFICE
CERTIFICATE OF CORRECTION

PATENT NO. : 8,539,238 B2  Page 1 of 1
APPLICATION NO. : 11/746310
DATED : September 17, 2013
INVENTOR(S) : Rudelic It is certified that error appears in the above-identified patent and that said Letters Patent is hereby corrected as shown below:

In the Claims

Column 4, line 51, in claim 3, delete "processor:" and insert -- processor; --, therefor.

Signed and Sealed this
Twelfth Day of August, 2014

Michelle K. Lee
*Deputy Director of the United States Patent and Trademark Office*